United States Patent
Duggal et al.

(10) Patent No.: US 9,767,106 B1
(45) Date of Patent: Sep. 19, 2017

(54) SNAPSHOT BASED FILE VERIFICATION

(71) Applicant: EMC CORPORATION, Hopkinton, MA (US)

(72) Inventors: Abhinav Duggal, Bangalore (IN); Dheer Moghe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

(21) Appl. No.: 14/320,476

(22) Filed: Jun. 30, 2014

(51) Int. Cl.
*G06F 17/30* (2006.01)

(52) U.S. Cl.
CPC .. *G06F 17/30088* (2013.01); *G06F 17/30303* (2013.01)

(58) Field of Classification Search
CPC ......... G06F 17/30575; G06F 17/30156; G06F 17/3033; G06F 17/30109; G06F 17/30162; G06F 17/3028; G06F 17/30067; G06F 11/2094; G06F 11/1461; G06F 11/1458; G06F 11/1469; G06F 11/1456; G06F 11/1451; G06F 11/1453; G06F 17/30194; G06F 17/30215; G06F 17/30073; G06F 17/30174; G06F 11/1464; G06F 11/1459; G06F 2201/84; G06F 12/121; G06F 17/30088; G06F 17/30303
See application file for complete search history.

(56) References Cited

U.S. PATENT DOCUMENTS

| | | | | |
|---|---|---|---|---|
| 6,785,352 B1* | 8/2004 | Ranta | .......... | H04B 7/2684 370/516 |
| 7,181,477 B2* | 2/2007 | Saika | .......... | G06F 3/0608 707/E17.104 |
| 7,567,991 B2* | 7/2009 | Armangau | .......... | G06F 11/1435 711/161 |
| 7,765,187 B2* | 7/2010 | Bergant | .......... | G06F 11/1435 707/614 |
| 8,046,547 B1* | 10/2011 | Chatterjee | .......... | G06F 11/1461 707/649 |
| 8,175,418 B1* | 5/2012 | Keith, Jr. | .......... | G06F 11/1448 382/166 |
| 8,615,495 B1* | 12/2013 | Payne | .......... | G06F 11/1451 707/646 |

(Continued)

OTHER PUBLICATIONS

EMC Data Domain Replicator—EMC²—White Paper—Apr. 2013.

(Continued)

*Primary Examiner* — Anh Ly
(74) *Attorney, Agent, or Firm* — Hamilton, Brook, Smith & Reynolds, P.C.

(57) ABSTRACT

In an embodiment, a method can include loading a first snapshot of data stored on a storage device, the first snapshot being verified. The method can further include capturing a second snapshot of data stored on the store device after waiting an interval of time from creation of the first snapshot. The method can further include generating a list of closed files between the two snapshots by differentiating the first snapshot and the second snapshot. The method can additionally include verifying the second snapshot by comparing the closed files in the list of closed files by in the second snapshot to the closed files in the storage device, which is an active snapshot. The method can also include deleting the first snapshot.

20 Claims, 9 Drawing Sheets

(56) References Cited

U.S. PATENT DOCUMENTS

| | | | | |
|---|---|---|---|---|
| 8,850,146 | B1* | 9/2014 | Majumdar | G06F 12/08 707/649 |
| 2004/0267836 | A1* | 12/2004 | Armangau | G06F 11/1435 714/E11.136 |
| 2005/0198083 | A1* | 9/2005 | Saika | G06F 3/0608 707/E17.104 |
| 2005/0261886 | A1* | 11/2005 | Kagarlis | G06F 17/5009 703/22 |
| 2006/0053139 | A1* | 3/2006 | Marzinski | G06F 11/1464 714/E11.136 |
| 2008/0010322 | A1* | 1/2008 | Lee | G06F 17/30174 707/E17.01 |
| 2008/0046432 | A1* | 2/2008 | Anderson | G06F 17/30088 707/E17.01 |
| 2008/0046475 | A1* | 2/2008 | Anderson | G06F 17/30088 707/E17.01 |
| 2008/0059541 | A1* | 3/2008 | Fachan | G06F 17/30088 707/E17.01 |
| 2008/0126773 | A1* | 5/2008 | Martinez | G06F 21/57 713/1 |
| 2009/0006496 | A1* | 1/2009 | Shoens | G06F 17/3023 707/E17.005 |
| 2010/0077165 | A1* | 3/2010 | Lu | G06F 11/1451 711/162 |
| 2011/0099148 | A1* | 4/2011 | Bruning, III | G06F 11/1004 707/639 |
| 2011/0225129 | A1* | 9/2011 | Agrawal | G06F 17/30156 707/692 |
| 2011/0252208 | A1* | 10/2011 | Ali | G06F 11/1451 711/162 |
| 2013/0054533 | A1* | 2/2013 | Hao | G06F 17/30 707/649 |
| 2013/0159257 | A1* | 6/2013 | Rao | G06F 17/30088 707/649 |
| 2013/0325824 | A1* | 12/2013 | Shoens | G06F 17/30115 707/698 |
| 2014/0149353 | A1 | 5/2014 | Lee | |
| 2014/0279909 | A1 | 9/2014 | Sudarsanam | |
| 2014/0325770 | A1* | 11/2014 | Somers | B60T 3/00 14/69.5 |

OTHER PUBLICATIONS

EMC Data Domain Operating System, Power EMC Protection Storage—EMC$^2$ Apr. 2014.
Office Action for U.S. Appl. No. 14/451,795 dated Apr. 18, 2016.
Office Action for U.S. Appl. No. 14/451,795 dated Nov. 17, 2016.
Final Office Action for U.S. Appl. No. 14/451,795 dated Aug. 4, 2016.
Final Office Action for U.S. Appl. No. 14/451,795 dated Mar. 13, 2017 entitled "Using Dataless Snapshots for File Verification".
Office Action for U.S. Appl. No. 14/451,795 dated Jul. 10, 2017.

* cited by examiner

| Metadata | | | User Data |
|---|---|---|---|
| Content Handle₁ | UID₁ | GID₁ Permission Data₁ | Data₁ |
| Content Handle₂ | UID₂ | GID₂ Permission Data₂ | Data₂ |
| ... | | | |
| Content Handle_N | UID_N | GID_N Permission Data_N | Data_N |

Fig. 5   500

| Metadata | | | User Data |
|---|---|---|---|
| Content Handle$_1$ | UID$_1$ | GID$_1$ Permission Data$_1$ | NULL |
| Content Handle$_2$ | UID$_2$ | GID$_2$ Permission Data$_2$ | NULL |
| ... | ... | ... | ... |
| Content Handle$_N$ | UID$_N$ | GID$_N$ Permission Data$_N$ | NULL |

Fig. 6   600

SNAPSHOT BASED FILE VERIFICATION

RELATED APPLICATION

This application is related to "File Verification Using Dataless Snapshots" by Dheer Moghe and Abhinav Duggal, Ser. No. 14/320,487, co-filed on the same day as the present Application and assigned to a common Assignee.

The entire teachings of the above application are incorporated herein by reference.

BACKGROUND

As part of the Data Invulnerability Architecture (DIA), all the files on a Data Domain Restorer (DDR) are verified to ensure completeness. Verification includes reading all indirect segments in a segment tree and ensuring existence of leaf segments in the segment tree for a file. If, during verification, any missing segments are discovered, an alert is generated to identify the files with missing segments. The primary motivation for verifying the files is to identify data loss due to software errors during ingest, replication, or garbage collection (GC).

Verification can be performed inline during ingest. Upon new segment arrival, segment reachability checks can be performed for the new segments when they are being written. However, if a bug causes a missing segment, that segment would be missed. The advantage of performing file verification offline, as opposed to inline, is that there is a background job which checks for reachability in case a software bug in write path, GC or replication caused a missing segment.

Data Domain systems, such as the DDR, are designed to ensure reliable recovery of data. The DDR DIA architecture provides inline write and read verification, which protects against and automatically recovers from data integrity issues during data ingest and retrieval. Capturing and correcting input/output (I/O) errors inline during the backup process eliminates the need to repeat backup jobs, ensuring that backups complete on time and satisfy service-level agreements. In addition, unlike other enterprise arrays or file systems, continuous fault detection and self-healing ensures data remains recoverable throughout its lifecycle on the DDR.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 is a diagram illustrating an example embodiment of a logical layout of a data-full snapshot.

FIG. 6 is a diagram illustrating an example embodiment of a logical layout of a dataless snapshot.

DETAILED DESCRIPTION OF THE INVENTION

Figure 1:
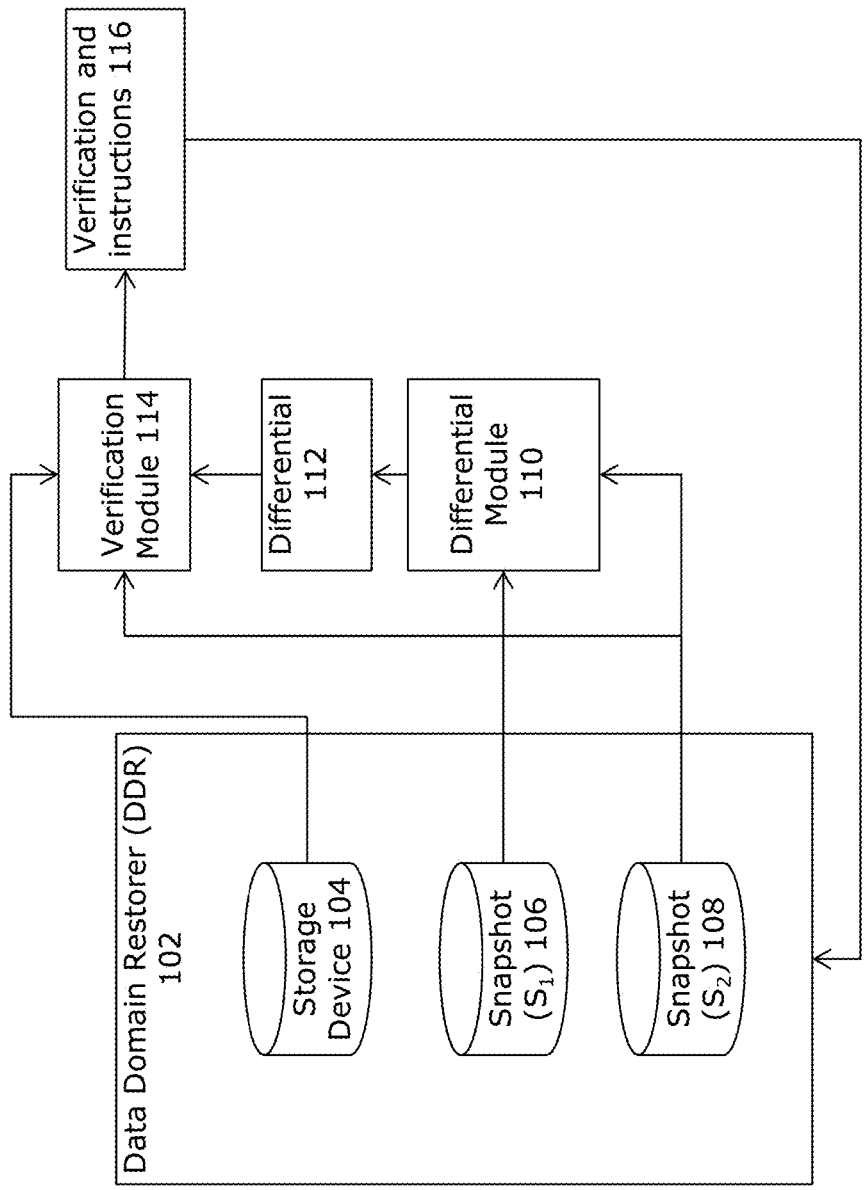
FIG. 1 is a block diagram illustrating an example embodiment of a data domain restorer (DDR) used in the present invention.

A description of example embodiments of the invention follows.

File verification can be triggered when a modified file is closed. Upon closing the file, the file is added to a list of "to be verified" files that is maintained by the file verification process. This list can be maintained by time order (e.g., modification time on the file) and therefore files in this list are verified in a first-in-first-out (FIFO) order. File verification employs modification time of the last verified file as a marker for restarting file verification after a file system restart. The modification time of the verified file is stored persistently on the disk. All the files are verified in an increasing order of the timestamp to use the modification time on the file as a marker. During a system restart, file verification walks through all the files in the namespace and adds the files with modification time stamp greater than the last verified timestamp on the disk to a to-be-verified list.

Without implementing embodiments of the present invention, file verification has the following limitations. First, during startup, file verification walks through the entire namespace to distill the list of files that need verification. This can add significant latency and cost during startup especially in presence of large namespaces. In addition, certain scenarios call for verifying all the files in the system. One such scenario is after data loss, when it is desirable to find out the files which are affected by the data loss. Since file verification maintains an ordered list based on modification time, it needs to load all the file handles into memory and generate a sorted list to perform verification. This can add significant memory overhead specially in presence of large namespaces.

The modification time of a file is not a robust marker and can result in correctness errors. If the clock time on the DDR is changed, the modification time on newer files can be lower than older files, and can therefore result in skipping verification on these newly written files after a filesystem restart. Similarly, the modification timestamp on a file in a replica is not generated locally and is inherited from the source, so file verification can therefore be erroneously skipped on certain files having an incorrect inherited timestamp after a filesystem restart.

In an embodiment of the present invention, a verified snapshot is a snapshot that all segments referred to by its files are verified to be reachable in valid containers. A non-verified snapshot is a snapshot that has neither been verified nor had file verification run on it.

Snapshot based file verification employs incremental differences between two snapshots to derive the set of files that have been closed and need verification. Once file verification has verified all of the closed files in a snapshot, it marks that snapshot as being completely verified and moves on to the next snapshot. For this scheme to work, it needs to have one base snapshot (called the verified snapshot) and another snapshot (called the current or to be verified snapshot) to be present. In a steady state, when all the files have been verified, the system has a single verified snapshot.

An MTree is a data management object exported by the DDR which represents a self-contained namespace. An MTree enables data management operations like snapshot and replication and represents a file-system. An MTree is stored on the disk as a B+Tree (e.g., BTree, B-Tree) and the meta-data for each file is stored in an object called Inode. For a deduplicating file-system, among other attributes the inode also stores a hash which uniquely identifies the contents of the file. A B+tree is a tree data structure that keeps data sorted and allows searches, insertions, and deletions to the B+tree in logarithmic time (e.g., time proportional to the logarithm of the size (number of nodes) of the B+tree). Each node of a B+tree can have multiple children. A B+tree is optimized for situations for reading and writing large blocks of data, such as databases and filesystems. The Mtree is accessible to clients via its export path and handle, and can be viewed as a filesystem.

MTree replication is used to replicate MTrees between Data Domain systems. Periodic snapshots are created on the source and the differences between them are transferred to the destination by leveraging the same cross-site duplication mechanism used for directory replication. This ensures that the data on the destination is always a point-in-time copy of the source with file-consistency. This also reduces replication of churn in the data, leading to more efficient utilization of the Wide Area Network (WAN). MTree replication supports all the replication topologies supported by directory replication.

File verification can enumerate all the Mtrees and add files to the verify list. However, this creates two problems. First, an unbounded list can create problems. For example, if the namespace contains 1 billion files, there may not enough memory for storing the file handles. Each object is verified corresponding to each namespace entry. This issue could occur on every system restart. A second issue is the walk on every restart. Even though files whose creation time is greater than their last verified time are added to the list, a walk on is performed every restart in its entirety.

In an embodiment of the present invention, file verification can be based on snapshots. The process takes snapshots, uses the differential mechanism to verify only those files which have changed since the last verified snapshot and add them to the bounded verify list. For each Mtree, snapshots are taken on source and exposed on replica at regular intervals (e.g., a typical 15 min frequency). Files which have changed in the two snapshots are added to the verify list. This list also contains files which are still open. To keep the list bounded, only a batch of entries are produced in the differential and added to the verify list. Once verification threads complete the verification of this batch, the next set of entries from the snapshot differential are added to the verify list. The size of the batch is in terms of number of files. The batch ensures that the verify list is bounded.

In an embodiment of the present invention, snapshot differentials can find out which files need to be verified. A snapshot is a read-only, point-in-time copy of a particular filesystem and consists of a namespace and the files in the namespace. A snapshot is used as a first level marker in this scheme. Once all the files in a snapshot are verified, the snapshot is marked as a "verified" snapshot. Subsequently another snapshot can be taken (e.g., called the "current" snapshot) and only the files of the current snapshot that have been modified and closed since the "verified" snapshot are verified. These files are obtained by finding the difference (e.g., differential) between the "current" and "verified" snapshot.

In an embodiment of the present invention, a method can include converting a data-full snapshot having a plurality of user data and corresponding metadata to a dataless snapshot. The dataless snapshot stores the metadata corresponding to the user data.

In an embodiment, converting the data-full snapshot to the dataless snapshot includes removing the user data from the data-full snapshot. In another embodiment, converting the data-full snapshot to the dataless snapshot includes copying the metadata from the data-full snapshot to the dataless snapshot.

In an embodiment, the metadata can be at least one of a checksum or hash of the corresponding user data.

In an embodiment, the method can further include verifying user data of a file system based on the metadata of the dataless snapshot. The method can further include employing a data-full snapshot that has been previously created by a user or internal process.

In another embodiment, the method can include receiving a request to perform garbage collection on a storage medium storing the data-full snapshot. Log-based file systems (such as the MTrees used by the DDR) need to reclaim space from the tail of the log to prevent the file system from becoming full when the head of the log wraps around to meet it. Garbage collection is such a reclamation of space.

The method can further include determining the data-full snapshot is to be used for file verification only, and if so, proceeding with converting the data-full snapshot to the dataless snapshot.

In an embodiment, a system includes a storage medium and a conversion module configured to convert a data-full snapshot having a plurality of user data and corresponding metadata to a dataless snapshot. The dataless snapshot can store the metadata corresponding to the user data. The data-full snapshot and dataless snapshot can be stored on the storage medium.

In an embodiment, a non-transitory computer-readable medium can be configured to store instructions for creating a dataless snapshot. The instructions, when loaded and executed by a processor, cause the processor to convert a data-full snapshot having a plurality of user data and corresponding metadata to a dataless snapshot. The dataless snapshot can store the metadata corresponding to the user data.

FIG. 1 is a block diagram 100 illustrating an example embodiment of a Data Domain Restorer (DDR) 102 used in the present invention. The DDR 102 includes a storage device 104, a Snapshot (S1) 106 and Snapshot (S2) 108. The snapshots 106 and 108 can be stored on the same storage device (e.g., storage device 104) or on separate storage devices. Additional snapshots can also be stored. The snapshot (S1) 106 is a capture of a state of the storage device 104 at an earlier time than the snapshot (S2) 108. The system can set up an interval of time taken between snapshots. For instance, one interval of time can be 15 minutes, although other intervals can be employed. In some embodiments, snapshots may be created automatically based on at least one of a timer or an interrupt. In other embodiments, snapshots may be created by a user command.

To verify a snapshot, a differential module 110 generates a differential 112 based on the Snapshot ($S_1$) 106 and Snapshot ($S_2$) 108. The differential 112 indicates the differences (e.g., changed files) between the Snapshot ($S_1$) 106 and Snapshot ($S_2$) 108. Generally, the differential 112 corresponds to a list of files that are closed in the Snapshot ($S_2$) 108 that are not closed in Snapshot ($S_1$). Closed files are of interest because they indicate files which may have changed between capturing Snapshot ($S_1$) 106 and Snapshot ($S_2$) 108. Then, a verification module can compare the files of the Snapshot ($S_2$) 108 to the corresponding files in the storage device 104 (e.g., the active snapshot or current state of the files). The verification module 114 outputs verification and instructions 116 to the DDR 102. If the verification is positive, then the instructions can be to delete the Snapshot ($S_1$) 106 and make the Snapshot ($S_2$) 108 the verified snapshot. However, if there is an error in the verification, the instructions can be, for example, to take another snapshot or fix the error.

As described above, snapshots can be used to detect file closes. For example, again suppose that $S_1$ and $S_2$ are two snapshots, where $S_2$ is a snapshot taken at a point in time after $S_1$. Further suppose that the "active snapshot" denotes the current state of the filesystem. Further suppose that K represents a key produced in the snapshot differential of the two snapshots S1 and S2, and CH represents the content handle (e.g., a checksum or hash) of the file/key. The content handle (CH) is a checksum or hash of a given key/file. The content handle can be an effective way to compare keys/files from one snapshot to another. Files that have changed between S1 and S2 but are same between S2 and the Active Filesystem are the closed files. A process described below can determine which files have changed based on this information.

The process cycles through all keys K discovered in the differential of S2 and S1. CH represents the content handle in snapshot S, where S can be S1, S2 or Active. For each key, if the CH of a Key(S1) is not equal to the CH of a Key(S2), and the CH of the Key(S2) is equal to the CH of a Key(Active), the system verifies the CH of the Key(Active).

In a replica (e.g., Mtree replication) instead of a snapshot, a similar approach as described above can apply. For Mtree replication, the source creates the snapshot differential and sends changes to the destination. At the destination, a new snapshot is exposed once all the files from the source have arrived on the destination. By detecting content handles which have changed between two last snapshots but have not changed between the current and the last, file closes are detected.

Once all the files in a snapshot have been verified, the snapshot can be marked as fully verified. A subsequent snapshot can incrementally build on the verified state of the previous snapshot, verify newly closed files in the new snapshot and mark the new snapshot as fully verified. In this way, in a steady state file verification moves from one fully verified snapshot to another fully verified snapshot by deploying incremental snapshot diffs. Similarly, once a new snapshot is verified, the previous snapshot can be deleted to save storage space on the storage device.

For a granular crash recovery, file verification records the B+Tree key which has been fully verified during an incremental snapshot differential. With this, after a restart, file verification can resume by creating a differential of the two snapshots from the recorded B+tree key.

Figure 2:
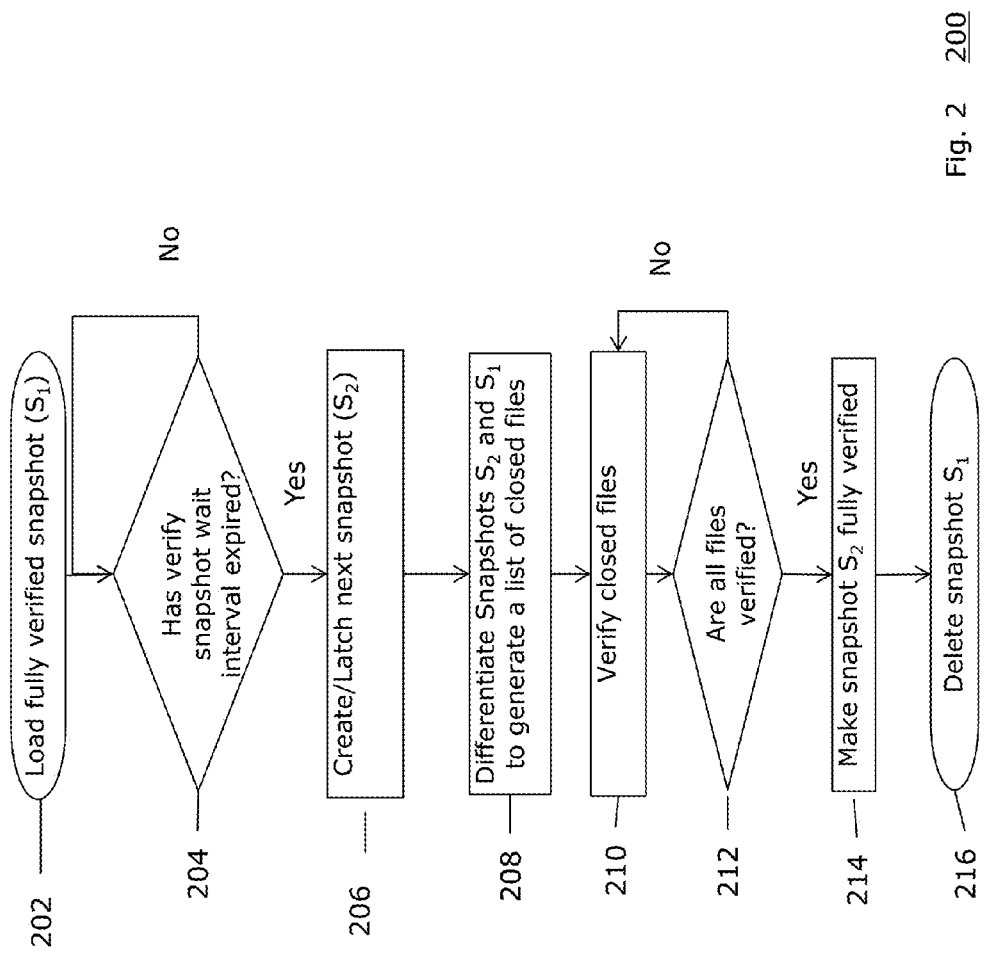
FIG. 2 is a flow diagram illustrating an example embodiment of a process employed by the present invention.

FIG. 2 is a flow diagram 200 illustrating an example embodiment of a process employed by the present invention. The file verification process (or state machine) can include the following. First, the process loads a fully verified snapshot ($S_1$) (202). The process then waits for an interval (e.g., 15 minutes) before taking the next snapshot (204). The process then creates or latches onto the next snapshot ($S_2$) (206). Latching onto a snapshot is using a user snapshot or an internal snapshot created by Mtree replication for file verification.

The process then differentiates snapshots $S_2$ and $S_1$ to generate a list of closed files (208). The process then verifies each closed file (210) and then determines whether all close files have been verified (212). If not, the process verifies the next closed file(s) (210). If so, the process marks snapshot $S_2$ as fully verified (214). Then, the process deletes the snapshot $S_1$, as snapshot $S_2$ can serve as the verified snapshot for the next file verification.

Figure 3:
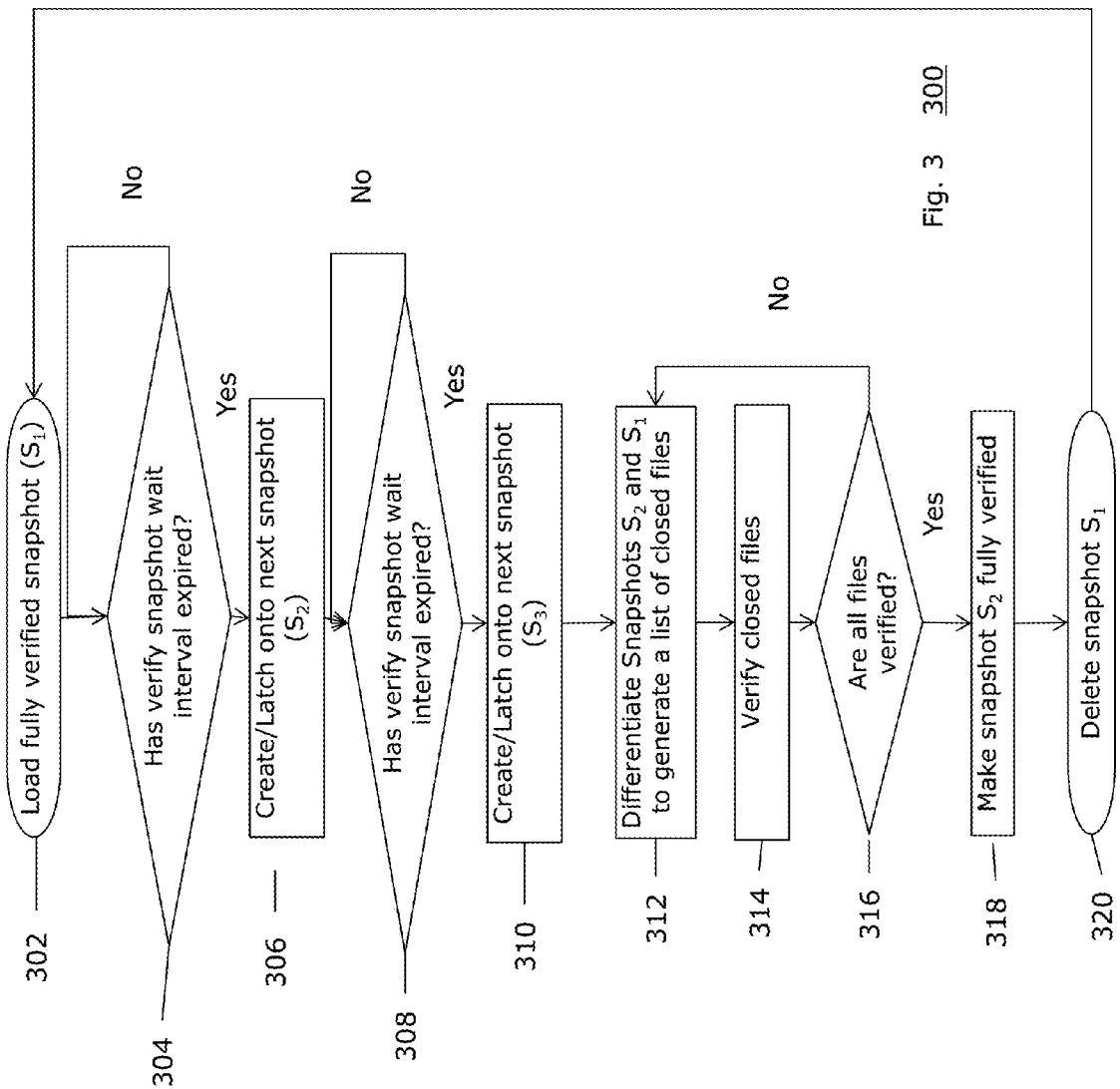
FIG. 3 is a flow diagram illustrating an example embodiment of a process employed by the present invention.

FIG. 3 is a flow diagram 300 illustrating an example embodiment of a process employed by the present invention. The file verification process (or state machine) can include the following. First, the process loads a fully verified snapshot ($S_1$), such as a Mtree replica (302). The process then waits for an interval (e.g., 15 minutes) before taking the next snapshot (304). The process then creates the next snapshot ($S_2$) (306). The state machine then waits another interval (e.g., 15 minutes) before taking third snapshot ($S_3$) (308). The third snapshot ($S_3$) is used to detect closes. The process then differentiates snapshots $S_2$ and $S_1$ to generate a list of closed files (308). The process then verifies each closed file (310) and then determines whether all close files have been verified (312). If not, the process verifies the next closed file(s) (310). If so, the process marks snapshot $S_2$ as fully verified (314). Then, the process deletes the snapshot $S_1$, as snapshot $S_2$ can serve as the verified snapshot for the next file verification.

Active(A) is the active filesystem representing the current state of the filesystem. The state machine creates a differential of $S_1$ and $S_2$, and then generates a list of candidate files. If files are changed between $S_1$ and $S_2$ and not changed in Active(A), the state machine verifies those files. Once the files are verified, then state resume resumes from next chunk from the snapshot differential.

Figure 4:
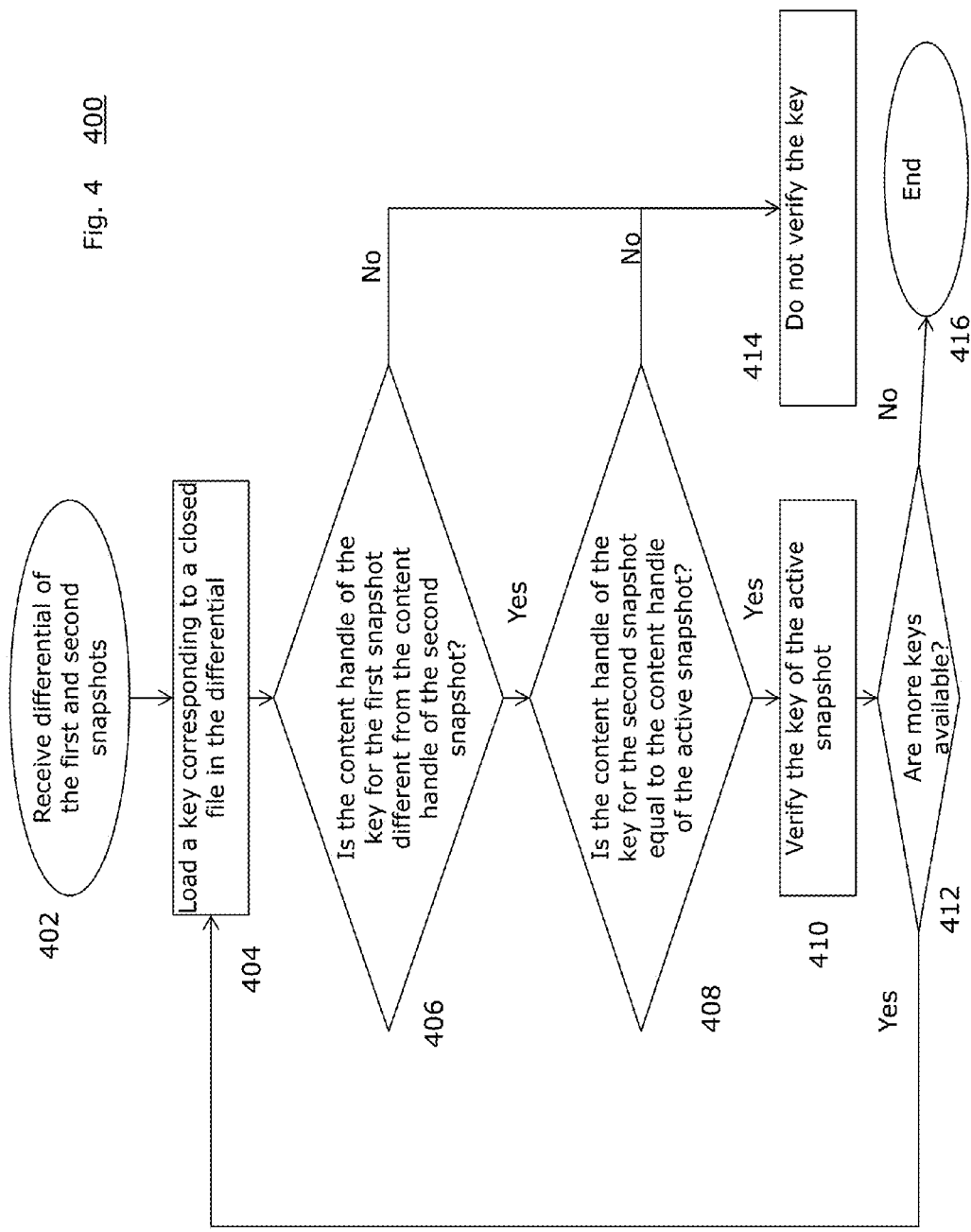
FIG. 4 is a flow diagram illustrating an example embodiment of a process of verifying a snapshot.

Once all the files in the snapshot differential are verified, the state machine deletes $S_1$, makes $S_2$ the fully verified snapshot and $S_3$ the current snapshot. The differential resumes from $S_2$ and $S_3$. In case of the first snapshot, all the files in the first snapshot are verified. Then the first snapshot becomes the last fully verified snapshot FIG. 4 is a flow diagram 400 illustrating an example embodiment of a process of verifying a snapshot. First, the process receives a differential of the first and second snapshots (402). Then, the process loads a key corresponding to a closed file in the differential (404). The process then determines whether the content handle of the key for the first snapshot is different from the content handle of the second snapshot (406) and whether the content handle of the key for the second snapshot is equal to the content handle of the active snapshot (408). If both are true (406, 408), then the process verifies the file corresponding to the content handle in the active snapshot (410). Then, the process determines whether more keys are available (412). If so, the process loads a key corresponding to a closed file in the differential (404) and continues the process again. If not (412), then the process ends (416).

On the other hand, if either the content handle of the key for the first snapshot is not different from the content handle of the second snapshot (406) or the content handle of the key for the second snapshot is not equal to the content handle of the active snapshot (408) then the system does not verify the key (414) because the file corresponding to the key was not closed between the two snapshots.

Snapshot based file verification provides several advantages. First, it provides faster startup. With snapshot based file verification, there is no need to walk through the entire namespace to figure out the list of files to-be-verified. The snapshot differential can be resumed from the specified key efficiently and without redoing previously done work. The memory footprint of the snapshot based file verification is minimal because it does not store a lot of states in memory to make progress. Instead, it generates a small chunk of differentiated files between two snapshots. The process does not depend on the modification timestamp on the file, and is therefore resilient to clock changes. The method can also perform in presence of replication.

An additional improvement to the file verification using snapshots is employing dataless snapshots for file verification. Dataless snapshots can provide the above advantages, but use less storage space in a storage medium, such as a hard drive or memory, than a full snapshot. Typically, a snapshot includes user data and metadata corresponding to that user data. For example, metadata can be in the form of an "iNode," which contains content handles of the data. The metadata can also include additional information, such as a user ID (UID) of the file, a group ID (GID) of the file, and/or read write permissions. While different types of metadata can be employed in the present invention, the description herein describes use of the content handle. The content handle is a unique signature, which can be a checksum, hash, or hash sum of the user data.

FIG. 5 is a diagram 500 illustrating an example embodiment of a logical layout of a data-full snapshot. The snapshot includes metadata 502 and user data 504. The metadata 502 can be a node (e.g., iNode) that includes content handles, a UID, a GID, and Permission Data, in one embodiment. The user data 504 includes Data. The snapshot can further include multiple portions of user data (e.g., $Data_1$, $Data_2$, ... $Data_N$) and corresponding metadata iNodes, (e.g., {Content Handle', $UID_1$, $GID_2$, and Permission $Data_1$}, {Content $Handle_2$, $UID_2$, $GID_2$, and Permission $Data_2$}, and {Content $Handle_N$, $UID_N$, $GID_N$, and Permission $Data_N$}). In most cases, the user data 504 takes up the majority of the storage space used by the snapshot. However, the user data 504 isn't necessarily needed to perform file verification.

FIG. 6 is a diagram 600 illustrating an example embodiment of a logical layout of a dataless snapshot. The dataless snapshot includes metadata 604 but does not store user data 604 as in FIG. 5. The metadata 602 can be a node (e.g., iNode) that includes content handles, a UID, a GID, and Permission Data, in one embodiment. The user data 604 stores "NULL" values, or alternatively does not have any storage allocated to it. The dataless snapshot can further include multiple abstractions of user data, which are all valued as "NULL" and corresponding metadata iNodes, (e.g., {Content $Handle_1$, $UID_1$, $GID_2$, and Permission $Data_1$}, {Content $Handle_2$, $UID_2$, $GID_2$, and Permission $Data_2$}, and {Content $Handle_N$, $UID_N$, $GID_N$, and Permission $Data_N$}). Because the user data 604 is NULL or abstracted away, the space usually taken up by user data, as in FIG. 5, is freed for other data needed by the system. The remaining metadata 602 can be used instead of the user data 604 for file verification, and the dataless snapshot of FIG. 6 takes up less space than the data-full snapshot of FIG. 5.

DDR uses a log-structured file system and uses a garbage collector to reclaim free space. Even when the data is deleted, space is reclaimed only when the garbage collection runs. For finding live segments in the system, the garbage collector enumerates the live files to identify live segments and reclaims the dead segments.

Figure 7:
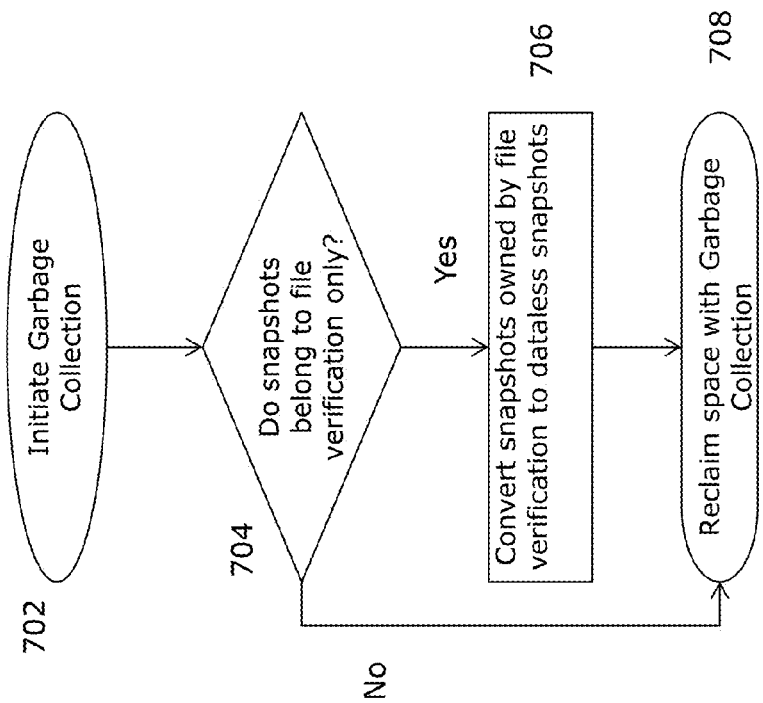
FIG. 7 is a flow diagram illustrating an example embodiment of a process employed by the present invention.

FIG. 7 is a flow diagram 700 illustrating an example embodiment of a process employed by the present invention. The process beings on initiation of garbage collection for a storage device (702). The process then determines whether snapshots belong/are owned by to file verification only (704). If so, it converts those snapshots that belong/are owned by file verification only to dataless snapshots (706). Snapshots existing for other reasons, such as user initiated snapshots that may require use of the data are not converted to dataless snapshots because the conversion makes the data unrecoverable. Then, the process reclaims space of the previously stored data with garbage collection (708). In reference to FIG. 1, the verification module 114 can perform file verification of both data-full snapshots and dataless snapshots, as described above in relation to FIGS. 5-7.

Since the snapshot based file verification uses at least one snapshot (sometimes using two snapshots) at a given point in time, the snapshots for file verification can potentially lock up free space on a storage medium. When file verification is performed at the same pace as data ingest, this is not a significant issue. However, in practice, file verification can sometimes lag behind data ingest substantially. Therefore, locking up space in file verification snapshots can become an impediment because multiple snapshots for file verification can take up unnecessary storage space. When a customer runs out of space on a DDR, the immediate response generally is to delete files and start garbage collection. In these cases, the customer may not be able to reclaim the space as expected because the snapshots should not be deleted until file verification is complete, which can result in errors and undesirable support calls.

Another issue with file verification with snapshot is with respect to embodiments using Mtree replication. Mtree replication replicates all the snapshots that are present on the source. The space occupied in the snapshots on the replica can only be reclaimed when the Mtree replication source deletes these snapshots. Therefore, lagging file verification on the source not only locks up space on the source in snapshots, but also prevents space from being reclaimed on the replica. This creates an unnecessary and undesirable coupling between the source and destination space consumption and reclamation.

To address the limitations described above, an embodiment of the present invention employs a non-replicable dataless snapshot for file verification as described above. A dataless snapshot is a type of snapshot where the space corresponding to the file data is not locked up by the snapshot. In embodiments employing data-full snapshots (or non-dataless snapshot), during garbage collection, the data-full snapshots are enumerated and the files that are locked up in the data-full snapshots are also enumerated and contribute to the live segments in the system. For a dataless snapshot, during enumeration, only the space occupied by the namespace for the snapshot (e.g., the content handle for a BTree corresponding to the snapshot) is enumerated, and the segment tree numeration of the files in the snapshot is skipped. This enables garbage collection to reclaim the space that is occupied by data files in these snapshots.

Snapshots are converted to be dataless when garbage collection runs. Just before garbage collection starts enumeration, a candidate snapshot is converted to a dataless snapshot. This allows file verification to work with regular snapshots most of the time, but during garbage collection, when space is reclaimed on the system, a candidate snapshot can be converted to a dataless snapshot.

On the DDR, a snapshot can be created externally by a user with a certain retention time. Internal activities, such as Mtree replication, can also create internal snapshots. Typically, a snapshot, whether created by a user or by internal system activities, is created with a finite retention time. Once the finite retention period expires, garbage collection can reclaim the space occupied by the snapshot.

To avoid creating unnecessary snapshots (in presence of Mtree replication), file verification can make use of snapshots created by the user or by other internal activities. If the file verification system cannot find any suitable snapshot when it needs one, file verification is configured to create its own snapshots. During garbage collection, if file verification detects that a snapshot is expired and no other internal activity other than file verification is interested in a snapshot, it converts the snapshot to a dataless snapshot. For a user and for other internal activity consumers of snapshots, these dataless snapshots are non-existent and therefore cannot be used except for file verification. When file verification needs to create a snapshot, they are not replicated to the Mtree destination, which decouples the Mtree source from its destination, because these snapshots are being created for purely local activity of file verification.

On an Mtree Replica, the file-system moves from one consistent snapshot to another. Mtree replication does this by periodically exposing a new snapshot. File verification on the replica makes use of these exposed snapshots because it cannot create its own snapshots on the replica. This makes the life cycle of snapshots used by file verification on the source and replica completely decoupled with respect to each other.

Converting a regular snapshot to a dataless snapshot is an irreversible operation, as the metadata of the user data cannot be converted to recreate the deleted user data. In other words, once a snapshot is made dataless, it cannot be made regular or data-full.

Figure 8:
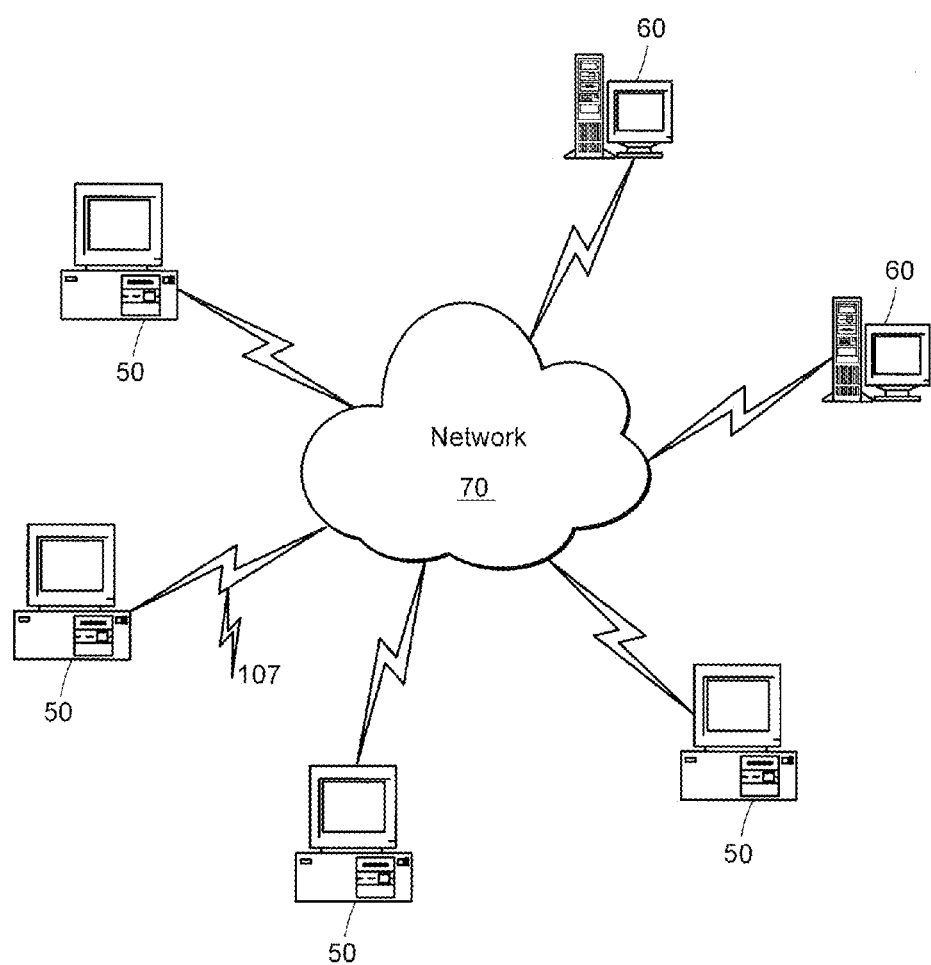
FIG. 8 illustrates a computer network or similar digital processing environment in which embodiments of the present invention may be implemented.

FIG. 8 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 9:
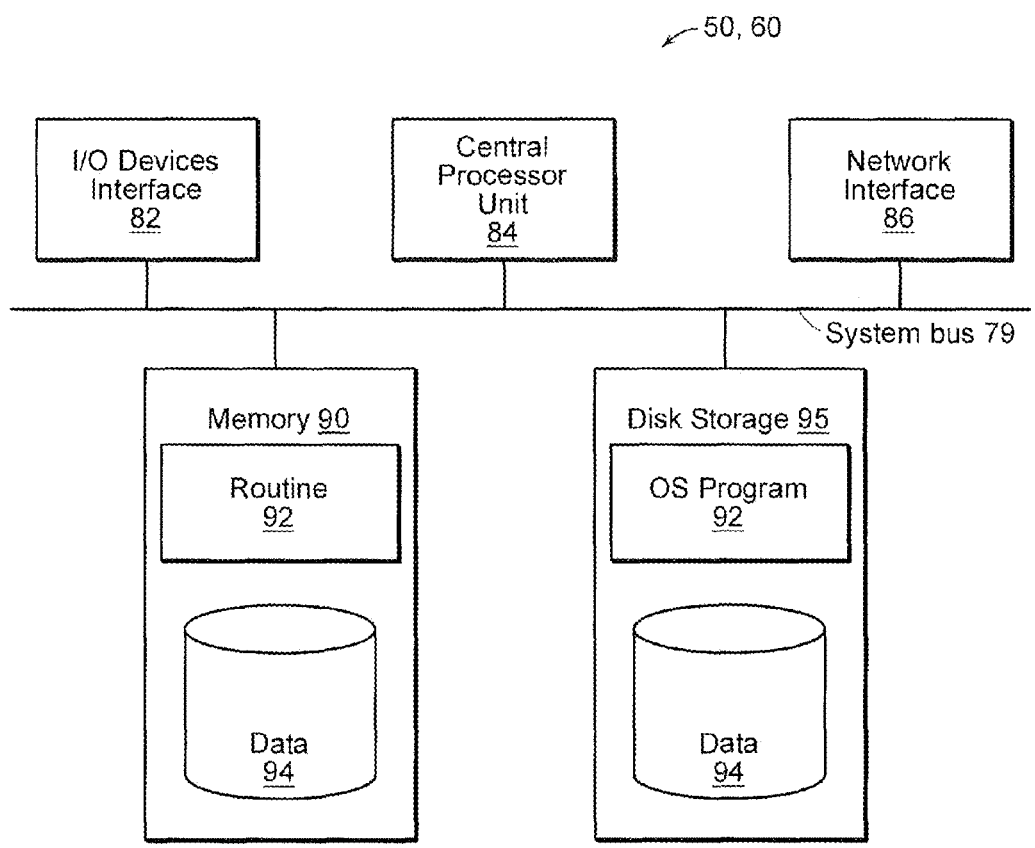
FIG. 9 is a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present invention (e.g., snapshot module, differential module, and verification module code detailed herein). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

Embodiments or aspects of the present invention may be implemented in the form of hardware, software, or firmware. If implemented in software, the software may be any form of software capable of performing operations consistent with the example embodiments disclosed herein. The software may be stored in any non-transitory computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:
1. A method comprising:
loading a first snapshot of data stored on a storage device;
verifying the first snapshot by determining that all segments referred to by files of the first snapshot are reachable in valid containers;
capturing a second snapshot of data stored on the storage device after waiting an interval of time from creation of the first snapshot;
generating a list of closed files in the second snapshot that are not closed in the first snapshot by differentiating the first snapshot and the second snapshot;
verifying the second snapshot by comparing the closed files in the list of closed files in the second snapshot that are not closed in the first snapshot to the closed files in the storage device, wherein the storage device is an active snapshot; and deleting the first snapshot.

2. The method of claim 1, wherein loading the first snapshot or capturing the second snapshot is performed by latching onto an existing snapshot on the storage device.

3. The method of claim 1, wherein generating the list of closed files between the two snapshots further includes determining, for a given file in the first and second snapshot, whether the content handle of the first snapshot is different from the content handle of the second snapshot.

4. The method of claim 3, wherein generating the list of closed files between the two snapshots further includes determining, for the given file in the first and second snapshot, whether the content handle of the key of the second snapshot is equal to the content handle of the file on the storage device, and if so, verifying the given file.

5. The method of claim 1, wherein the first snapshot and second snapshot are created automatically based on at least one of a timer or an interrupt.

6. The method of claim 1, wherein the first snapshot and second snapshot are created by a user command.

7. The method of claim 1, further comprising:
capturing a third snapshot after waiting an interval of time from creation of the second snapshot;
wherein the first snapshot, second snapshot, and third snapshot represent snapshots of Mtrees.

8. A system comprising:
a snapshot module configured to load a first snapshot of data stored on a storage device, the first snapshot being verified by determining that segments referred to by files of the first snapshot are reachable in valid containers, and further configured to capture a second snapshot of data stored on the store device after waiting an interval of time from creation of the first snapshot;
a differential module configured to generate a list of closed files in the second snapshot that are not closed in the first snapshot by differentiating the first snapshot and the second snapshot;
a verification module configured to verify the second snapshot by comparing the closed files in the list of closed files by in the second snapshot that are not closed in the first snapshot to the closed files in the storage device, wherein the storage device is an active snapshot, and delete the first snapshot.

9. The system of claim 8, wherein loading the first snapshot or capturing the second snapshot is performed by latching onto an existing snapshot on the storage device.

10. The system of claim 8, wherein the differential module is further configured to determine, for a given file in the first and second snapshot, whether the content handle of the first snapshot is different from the content handle of the second snapshot.

11. The system of claim 10, wherein the differential module is further configured to determine, for the given file in the first and second snapshot, whether the content handle of the key of the second snapshot is equal to the content handle of the file on the storage device, and if so, verify the given file.

12. The system of claim 8, wherein the first snapshot and second snapshot are created automatically based on at least one of a timer or an interrupt.

13. The system of claim 8, wherein the first snapshot and second snapshot are created by a user command.

14. The system of claim 8, further comprising:
capturing a third snapshot after waiting an interval of time from creation of the second snapshot;
wherein the first snapshot, second snapshot, and third snapshot represent snapshots of Mtrees.

15. A non-transitory computer-readable medium configured to store instructions for verifying data on a storage device, the instructions, when loaded and executed by a processor, causes the processor to:
load a first snapshot of data stored on the storage device;
verifying the first snapshot by determining that all segments referred to by files of the first snapshot are reachable in valid containers;
capture a second snapshot of data stored on the storage device after waiting an interval of time from creation of the first snapshot;
generate a list of closed files in the second snapshot that are not closed in the first snapshot by differentiating the first snapshot and the second snapshot;
verify the second snapshot by comparing the closed files in the list of closed files in the second snapshot that are not closed in the first snapshot to the closed files in the storage device, wherein the storage device is an active snapshot; and
delete the first snapshot.

16. The non-transitory computer-readable medium of claim 15, wherein loading the first snapshot or capturing the second snapshot is performed by latching onto an existing snapshot on the storage device.

17. The non-transitory computer-readable medium of claim 15, wherein the instructions further cause the processor to generate the list of closed files between the two snapshots further by determining, for a given file in the first and second snapshot, whether the content handle of the first snapshot is different from the content handle of the second snapshot.

18. The non-transitory computer-readable medium of claim 17, wherein the instructions further cause the processor to generate the list of closed files between the two snapshots further by determining, for the given file in the first and second snapshot, whether the content handle of the key of the second snapshot is equal to the content handle of the file on the storage device, and if so, verifying the given file.

19. The non-transitory computer-readable medium of claim 15, wherein the first snapshot and second snapshot are created automatically based on at least one of a timer or an interrupt.

20. The non-transitory computer-readable medium of claim 15, wherein the first snapshot and second snapshot are created by a user command.

* * * * *